Oct. 22, 1968
A. HONIG
3,407,298
LONG INFRARED TO SHORT INFRARED IMAGE CONVERTER
Original Filed March 2, 1965
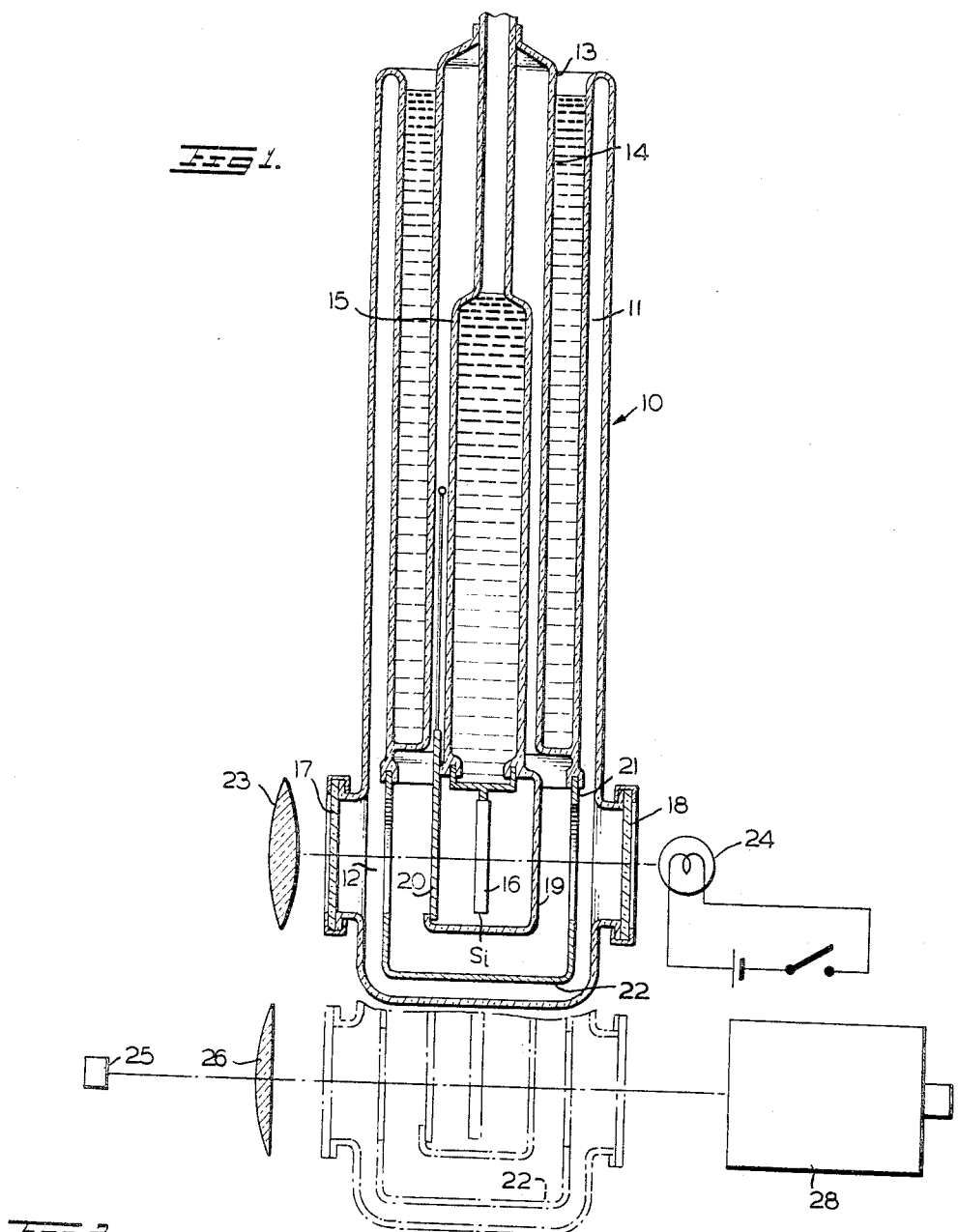
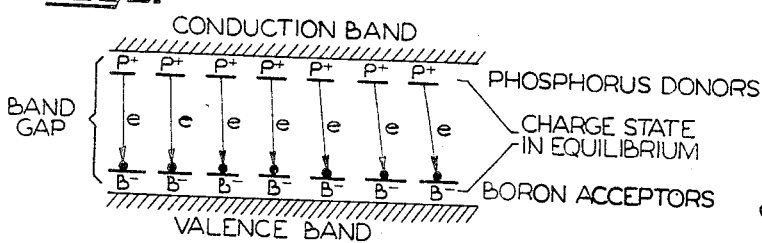
INVENTOR
ARNOLD HONIG
Stowell & Stowell
ATTORNEYS 3,407,298
LONG INFRARED TO SHORT INFRARED
IMAGE CONVERTER
Arnold Honig, Syracuse, N.Y., assignor to Research Corporation, New York, N.Y., a non-profit corporation of New York
Continuation of application Ser. No. 436,613, Mar. 2, 1965. This application Jan. 2, 1968, Ser. No. 695,291
10 Claims. (Cl. 250—83.3)

ABSTRACT OF THE DISCLOSURE

Infrared images in wavelengths above 3 microns are converted to visible or reproducible images by irradiating a plate of doped semiconductor material maintained at a temperature not substantially greater than about 4° K. with light of photon energy at least equal to the band gap of the semiconductor material to substantially neutralize the donor and acceptor ions of the semiconductor plate, focussing the infrared image on the plate to convert the neutral impurity atoms to ions in proportion to the local intensity of the infrared radiation and thereafter passing a collimated beam of infrared radiation of wave length not greater than about 3 microns through said plate whereby said radiation is absorbed by the residual neutral donor atoms in the plate to form an image in said beam corresponding to the long wave length infrared image theretofore focussed on the plate, which can be converted into a visible display, a photograph, a taped record or the like.

---

This invention is a continuation of application No. 436,613 filed Mar. 2, 1965 and now abandoned.

This invention relates to a method and apparatus for transducing images in infrared radiation of wave lengths above about 3 microns into images in infrared radiation not greater than about 3 microns. The invention is more particularly directed to a method and system of apparatus for providing photographs or other useful displays or records of images transmitted in or carried by infrared light of wave lengths above 3 microns.

Present photography is limited to light from the near infrared (about 1.3 micron wave lengths) to shorter wave lengths in the visible, ultraviolet and X-ray regions. Special devices, such as vidicons, exist for extending the range in the infrared to 2 microns, or even to 3 microns, but with lower resolution and speed than associated with photographic plates. There also exist scanning and static devices which produce crude images at longer wave lengths, but they are slow, of poor resolution, and expensive.

A photographic system responding to long wave lengths in the infrared has many uses. When employed passively, i.e. without an external light source, it is possible to make photographs in the overcast night sky, since the system responds to the infrared emitted by the environment. For medical diagnoses, it has already been established that "thermographs" can play an important role, since they detect the spatial temperature pattern of a patient. When the system is employed actively (i.e. with an external light source in the infrared), the system gains a large amount of versatility. With powerful laser sources becoming available in the infrared spectral region, the need for a photographic detection system is becoming pressing.

The invention is based on the discovery that when a semiconductor plate, for example, of silicon, germanium or a mixture of the two, lightly doped with donor and acceptor atoms, and maintained at a temperature not substantially greater than about 4° K., is irradiated with light of photon quantum energies at least equal to the band gap of the semiconductor material, the donor and acceptor ions are substantially neutralized and, at low temperatures, remain in the neutral state for a substantial period of time, that an image-carrying beam of long infrared radiation focussed on such plate converts the neutral impurity atoms to ions in proportion to the local intensity of the radiation thereby forming a corresponding "image" of ions in the plate, and that a collimated beam of infrared radiation of wave length not greater than about 3 microns passed through said plate is absorbed by the residual neutral donor atoms in proportion to their local concentration and emerges from the plate carrying an image in short wave length infrared radiation corresponding to the image received in long wave length infrared radiation. This image can be converted into a visible display, a photograph, a taped record or the like by methods and devices well known in the art.

The invention will be more particularly described with reference to the accompanying drawing in which FIG. 1 is a diagrammatic representation of an illustrative embodiment of the invention and FIG. 2 is a diagrammatic representation of the band gap in silicon containing shallow donor impurities and shallow acceptor impurities.

The apparatus of the drawing comprises a cylindrical Dewar tube 10 having an annular evacuated jacket 11 opening at the bottom into an evacuated space 12 and a concentric cylinder 13 connected with the inner wall of the evacuated jacket to provide an annular container 14 for liquid nitrogen. Concentrically positioned within cylinder 13 is a cylindrical container 15 for liquid helium forming a "cold finger" from the lower end of which plate 16 of silicon, or other semi-conductor material, is vertically suspended.

The lower space 12 of the Dewar tube is provided with windows 17 and 18 parallel with the extended surface faces of plate 16. Window 17 is of a material transparent to the wave length of the infrared light carrying the image to be transduced. For use between 3 and 6 microns a sapphire window is satisfactory; for use out to 25 microns KRS5 or Irtron IV glass windows may be used. Window 18 can be made of Pyrex glass when the radiation used for read out is about 2 microns in wave length.

19 is a Pyrex glass radiation shield and 20 is a Pyrex glass shutter which can be raised and lowered through suitable vacuum seals or by magnetic means not shown. The Pyrex glass shield and shutter serve to shield the silicon plate from external room temperature radiation except when an exposure is to be made. The Pyrex glass absorbs virtually all the energy at wave lengths longer than 3.5 microns. Which is more than 99.9% of the thermal background and does not itself radiate appreciably at the low temperature maintained in the Dewar. A fixed filter can be positioned adjacent the Pyrex glass shutter when the exposure is to be made in a narrow band region such as 3 to 6 microns. Sapphire at the low temperature of the Dewar would be satisfactory in this region. 21 and 22 are metallic radiation shields.

A suitable lens or lens system 23, for example, of germanium, is positioned adjacent window 17 to focus the incoming infrared image on the plane surface of silicon plate 16.

A source of light of energy at least equal to the band gap of the semiconductor material, such as white light source 24 is positioned adjacent window 18.

Positioned below that of lens 23 and light source 24, for example at a level, indicated in dashed lines in the drawing, to which the Dewar assembly can be lowered for read out, are infrared source 25 capable of supplying infrared light of selected wave lengths below about 3 microns and a collimating lens or lens system 26 adjacent the lowered position of window 17. Adjacent the lowered position of window 18 is a suitable receiver or recorder such as vidicon 28.

The silicon plate 16 contains relatively low concentrations of donor and acceptor impurities. The operation of the invention will be particularly discussed with reference to phosphorus as donor and boron as acceptor although other Group V donors, such as arsenic, antimony and bismuth, and other Group III acceptors, such as aluminum, gallium and indium may be used.

In the operation of method of the invention the doped silicon plate 16 is prepared or sensitized by flashing white light from source 24 on the plate and the prepared plate is then exposed to an image in long wave lengths focussed on the plate by lens 23, the Pyrex glass shutter being raised for the appropriate exposure time, as hereinafter discussed, and then replaced. An image is now frozen into the silicon for periods of up to hours (depending on the adequacy of the shielding from outside radiation) and may be read out at any time as hereinafter discussed.

The process of image formation in the semiconductor plate is believed to take place as follows:

Consider a sample which is just compensated, although a small excess of preferably the acceptor but even of the donor is acceptable. In equilibrium, the phosphorus and the boron impurities are all ionized, since that corresponds to the lowest energy state. When white light of sufficient intensity and duration is flashed on the sample, free electrons and holes are generated in the conduction and valence bands, respectively. These are quickly captured by the charged donors and acceptors respectively, rendering these latter neutral. If the impurities are sufficiently dilute, this metastable state of neutral impurities can remain for hours. This is true for concentrations of donors up to about $2\times10^{16}/cm.^3$. At higher concentrations, the electrons and holes associated with the neutral impurities can spontaneously annihilate each other with the emission of photons and phonons. The rate of this process increases steeply with increasing concentration. When the system is "prepared" by the intrinsic white light illumination, it consists of all neutral atoms and would remain so indefinitely if shielded from all extrinsic radiation. However, when exposed to radiation in the 1–25 micron region (extrinsic radiation), the electrons can be ionized from the neutral phosphorus (and the holes from the neutral boron). This process is called delocalized electron transfer, since by means of the ionization, an electron (or hole) eventually is captured by a B°(or P°) and cannot again be reexcited by extrinsic radiation. The rate at which this capture occurs is about 1% of the rate of ionization for phosphorus and boron impurities, but can be made at least 8 times greater with a different choice of impurities. Even 1% is quite sufficient to make a good image within a reasonably short exposure time. From simple optical considerations and the absorption coefficient vs. wave length for silicon, the exposure time can be estimated. Using an $f/1$ lens, and the band between 8 and 10 microns, an exposure time of about a second would be required in the absence of an external source. With other shallow impurities, this could be reduced to about 0.1 second or less. Using infrared laser sources, exposure times shorter than a millisecond would be adequate. The resulting image after exposure resides in the variable density of neutral phosphorus impurities. Where a large number of photons is focussed on the silicon, a large number of electron transfers from the neutral phosphorus occurs, thereby reducing the concentration of neutral phosphorus. Where little radiation is focussed, the neutral phosphorus concentration remains near its maximum value.

The resolution of the image must also be considered. Assume perfect optics with the germanium lens. Then loss of resolution arises from diffusion of the ionized electrons before final capture. This diffusion distance can be estimated from the expression for diffusion length, $L=(D\tau)^{1/2}$, where $D$ is the diffusion constant, and $\tau$ is the lifetime against final capture. If the electron becomes thermalized in a shorter time than the capture time, $D$ for silicon at 4° K. (liquid helium) equals $\mu k\tau/e$, or about 3 $cm.^2/sec.$ $\tau$ has been measured to be about $10^{-9}$ sec. for impurity concentration $N\sim10^{16}/cm.^3$, after illumination with intrinsic light. Thus, $L$ comes out less than $10^{-4}$ cm. Allowing for non-thermalization of the electron. $L$ could not exceed $3\times10^{-3}$ cm., which is still at satisfactory resolution.

To read out or develop the image in the silicon plate the spatial density distribution of neutral phosphorus must be sensed. This is effected by a method based on the absorption characteristic of neutral phosphorus impurities in the infrared. If a collimated beam of 2 micron light impinges on the plate after it is exposed, those regions that are dense in P° will not transmit the beam. Thus, if the 2 micron parallel beam of light is observed on the other side of the silicon (transmitted beam), it will be a positive of the original image, since a large amount of 2 micron radiation will go through only those portions of the silicon which were subjected to large illumination (and hence had their P° density depleted) during the exposure.

To obtain sufficient absorption, the absorption coefficient at 2 microns, $\alpha(2\mu)$, multiplied by the effective thickness $\gamma(2\mu)t$ of the silicon, must be about 1. $\gamma(2\mu)$ is a constant greater than one, which when multiplied by the silicon thickness $t$, gives the effective thickness at $2\mu$. However, for optimum exposure conditions at $10\mu$, $\alpha(10\mu)\times\gamma(10\mu)t$ should also be about 1. The dependence of $\alpha(\lambda)$ on $\lambda$ is known. For example, $\alpha(10\mu)$ is about 7½ times $\alpha(2\mu)$. Thus, to meet the requirements, $\gamma(2\mu)$ should be about 7½ times $\gamma(10\mu)$. This can be achieved by depositing, for the $2\mu$ radiation, approximately a half wave length coating (of aluminum oxide, for example) or multiple dielectric layers on both faces of the silicon which should be very parallel. By making the faces about 86% reflecting, the $N(2\mu)$ will be increased about 7½ times. Only about 15% of the incident 2 micron beam will get through due to reflection at the first surface, but this is not a problem, since the 2 micron source can have any intensity. The coating will not affect the $10\mu$ exposure since the coating is tuned to 2 microns. Putting in the actual numbers for $\alpha(2\mu)$ and $\alpha(10\mu)$ for a silicon slab doped to about $2\times10^{16}/cm.^3$ yields an optimum sample thickness of about 3 millimeters, which does not present serious defocussing problems. At 20 microns, about 1 mm. thickness is appropriate, but the coating should be about 97% reflecting at $2\mu$. Thinner silicon could be used but that would necessitate longer exposures and higher reflection coatings. The $2\mu$ source should be a small point source placed at the focus of a collimating lens. A filtered Hg arc with a very small aperture could be used. An alternate read out scheme could use a very narrow 2 micron laser beam that scans the silicon plate rapidly.

Conversion of the image in the 2 micron beam to a visual or recordable image is readily effected by presently available means such as a vidicon type instrument which produces an image on a luminescent screen or records the image on magnetic tape. If infrared light of 1.3 microns wave length or less is used a visible image may be produced on presently available specially sensitized photographic plates, but a coating of considerably higher reflection would be required on the silicon.

After read out of the image the Dewar assembly is returned to its upper position and a flash of white light resensitizes the silicon plate for the next image.

It will be obvious that the arrangement of the external elements with respect to the Dewar assembly shown by way of illustration in FIG. 1 can be varied in many ways. For example, all of the external elements can be positioned in the same horizontal plane with the read out and pick up elements spaced 90° from the long wave focusing lens and the white light source, in which case the Dewar assembly would be rotated 90° between the two positions. By the use of optical devices such as rotatable mirrors in the exposure, read out and flash systems, motion of the Dewar system could be eliminated altogether except for lifting and lowering the Pyrex glass shutter.

I claim:

1. A transducer for infrared images in wave lengths above 3 microns comprising a plate of semiconductor material doped with donor and acceptor impurities, means for maintaining said plate at a temperature not substantially greater than about 4° K., means for irradiating the plate with light of photon energy at least equal to the band gap of the semiconductor material, means for focusing the infrared image to be transduced on a face of said plate and means for passing through said plate a collimated beam of infrared light of a wave length not greater than about 3 microns.

2. A transducer for infrared images in the wave length range from about 3 microns to about 25 microns comprising a plate of silicon doped with donor and acceptor impurities, means for maintaining said plate at a temperature not substantially greater than about 4° K., means for irradiating the plate with light of wave lengths shorter than about 1 micron, means for focusing the infrared image to be transduced on a face of said plate and means for passing through said plate a collimated beam of infrared light of a wave length not greater than about 3 microns.

3. A transducer for infrared images as defined in claim 1 wherein the faces of the semiconductor plate are coated with a reflecting layer to increase the effective optical thickness of the semiconductor plate at the wave length of the collimated infrared beam.

4. A transducer for infrared images as defined in claim 2 wherein the faces of the silicon plate are coated with a reflecting layer to increase the effective optical thickness of the semiconductor plate at the wave length of the collimated infrared beam.

5. A transducer for infrared images as defined in claim 1 including means for converting the image carried by the emergent collimated infrared beam into a visible or a reproducible image.

6. A transducer for infrared images as defined in claim 2 including means for converting the image carried by the emergent collimated infrared beam into a visible or a reproducible image.

7. A method for transducing images in infrared radiation of wave lengths above about 3 microns into images in infrared radiation of wave length not greater than about 3 microns which comprises exposing to light of photon energy at least equal to the band gap of the semiconductor material a face of a semiconductor plate, doped with donor and acceptor impurities and maintained at a temperature not substantially greater than about 4° K., to substantially neutralize the donor and acceptor ions in the impurities, focusing the longer wave length image on a face of the plate, and thereafter passing a collimated beam of infrared light of a wave length not greater than about 3 microns through said plate.

8. A method for transducing images in infrared radiation of wave lengths from above 3 microns to about 25 microns into images in infrared radiation of wave length not greater than about 3 microns which comprises exposing to light of wave lengths shorter than about 1 micron a face of a silicon plate doped with donor and acceptor impurities and maintained at a temperature not substantially greater than about 4° K., to substantially neutralize the donor and acceptor ions in the impurities, focusing the longer wave length image on a face of the plate and thereafter passing a collimated beam of infrared light of a wave length not greater than about 3 microns through said plate.

9. A method for transducing infrared images as defined in claim 7 wherein the faces of the semiconductor plate are coated with a reflecting layer to increase the effective optical thickness at the wave length of the collimated infrared beam.

10. A method for transducing infrared images as defined in claim 10 wherein the faces of the silicon plate are coated with a reflecting layer to increase the effective optical thickness at the wave length of the collimated infrared beam.

References Cited

UNITED STATES PATENTS

| | | | |
|---|---|---|---|
| 2,920,205 | 1/1960 | Choyke | 250—83.3 |
| 2,953,529 | 9/1960 | Schultz | 250—83.3 |
| 3,271,578 | 9/1966 | Bockemuehl | 250—213 |

FOREIGN PATENTS 926,796   5/1963   Great Britain.

RALPH G. NILSON, *Primary Examiner.*

S. ELBAUM, *Assistant Examiner.*

UNITED STATES PATENT OFFICE
CERTIFICATE OF CORRECTION

Patent No. 3,407,298            October 22, 1968

Arnold Honig

It is certified that error appears in the above identified patent and that said Letters Patent are hereby corrected as shown below:

Column 6, line 29, claim reference numeral "10" should read -- 8 --.

Signed and sealed this 3rd day of March 1970.

(SEAL)
Attest:

Edward M. Fletcher, Jr.            WILLIAM E. SCHUYLER, JR.
Attesting Officer            Commissioner of Patents